United States Patent [19]
Kniff

[11] 3,831,980
[45] Aug. 27, 1974

[54] TOW BAR MEANS

[76] Inventor: August A. Kniff, 137 S. Eucla, San Dimas, Calif. 91773

[22] Filed: Dec. 13, 1972

[21] Appl. No.: 314,740

[52] U.S. Cl............ 280/402, 214/86 A, 280/491 E
[51] Int. Cl........................................... B62d 53/04
[58] Field of Search.................... 280/491, 402, 478; 214/86 A

[56] References Cited
UNITED STATES PATENTS

| | | | |
|---|---|---|---|
| 1,690,372 | 11/1928 | Livesay | 214/86 A |
| 1,860,518 | 5/1932 | Wells | 280/402 |
| 2,818,277 | 12/1957 | McElhoe | 280/491 R |
| 3,510,146 | 5/1970 | Hartman | 280/491 E |
| 3,737,177 | 6/1973 | Gal | 280/491 E X |

*Primary Examiner*—Leo Friaglia
*Assistant Examiner*—Randall A. Schrecengost
*Attorney, Agent, or Firm*—Donald D. Mon; D. Gordon Angus

[57] ABSTRACT

There is disclosed a tow bar device for towing a four-wheeled vehicle. The tow bar has a tongue at the rear for engagement with a yoke attached beneath the vehicle and a cross-bar at the position of the front end assembly with upstanding supports at the ends of the cross-bar. The upstanding supports are attachable to pivots at attachment plates secured at the front end assembly. Provision is made for two pivot points and also for accommodation of a range of elevations for the attachment.

5 Claims, 5 Drawing Figures

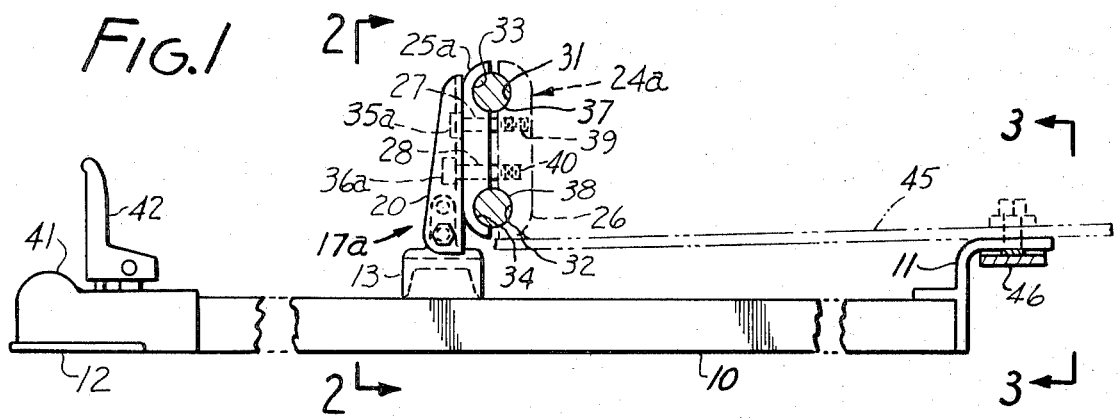
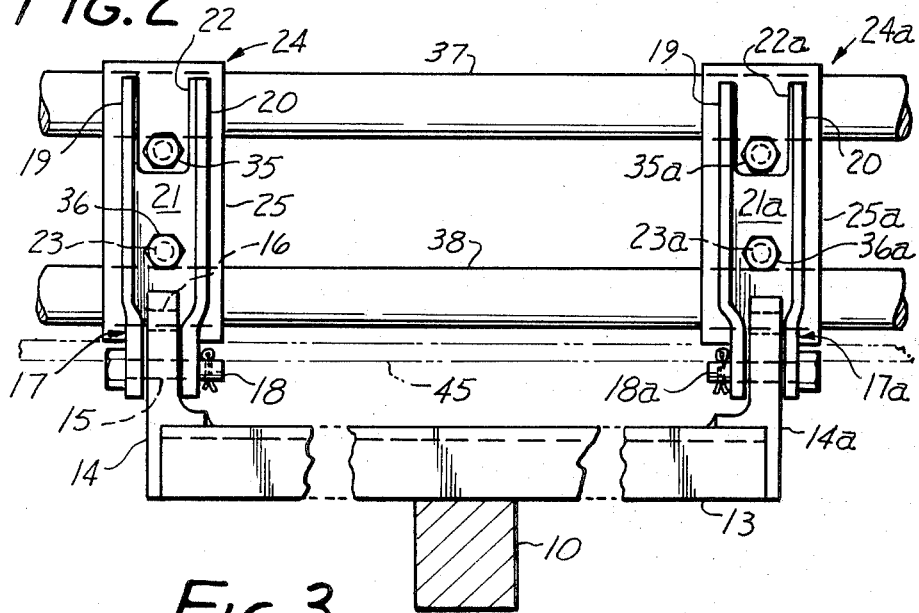
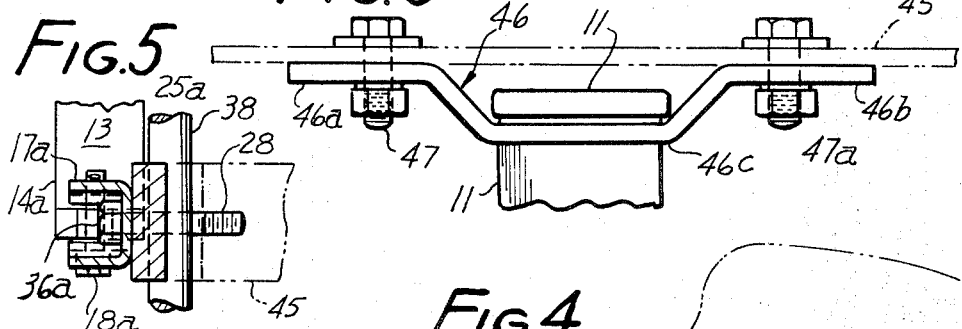
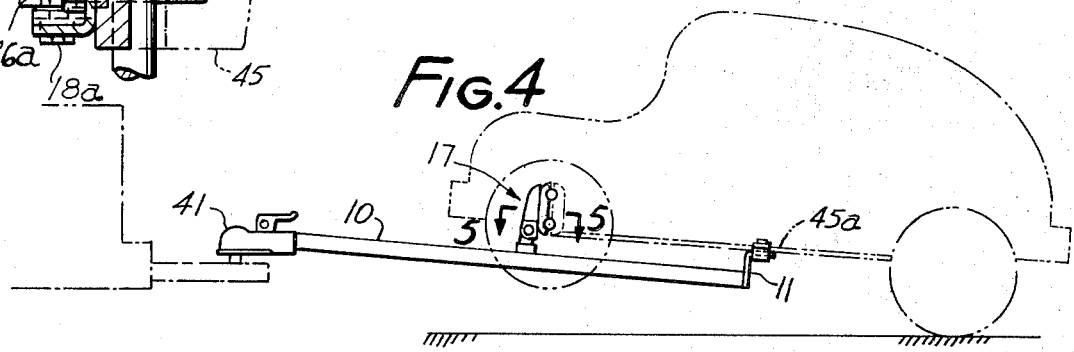

TOW BAR MEANS

This invention relates to towing devices for towing four-wheel vehicles.

In my co-pending application Ser. No. 264,766 filed June 21, 1972, and now U.S. Pat. No. 3,758,135, there are disclosed and claimed towing devices provided with a cross-bar at the location of the front end torsion bar and axle assembly so that the tow bar can protrude beneath the front end and engage a clip or yoke attached to the vehicle frame. The torsion bar assembly can be retained within channels attached to the cross-bar so that when the forward end of the two bar is lifted it lifts the front end of the vehicle and can be attached to the towing vehicle. While the towing device of that application is applicable to the towing of some models of vehicles there are other models to which it is not applicable, particularly those having plural torsion bars which are not always at the same height or distance apart in different vehicles.

An object of the present invention is to provide a towing device which is simple in construction and can be fitted in a simple manner to a vehicle.

Another object is to provide such a device which can tow vehicle models having structural and dimensional variations one from another.

The invention is carried out by provision of a towing bar which can be substantially straight throughout most or all of its length and provided with a tongue member at its rear end for engagement with a clip or a yoke fastened to the body frame at a central location behind the front end assembly, and having attached to it a cross-bar at a position forward of the tongue and coinciding with a position at the front end assembly of the vehicle. The cross-bar extends transversely from either side of the tow bar, and a pair of spaced upstanding supports is attached to the cross-bar at either side of the tow bar. Provision is made for fastening an attaching plate means at the front end of the vehicle, so that the said upstanding supports can be pivoted to the attaching plate means.

A feature of the invention resides in the provision of a plurality of pivot holes for pivoting the attaching plate means to the upstanding supports so that the upstanding supports can be raised or lowered relative to the attaching plate means to accommodate particular configurations or dimensions at the front end of the vehicle. The forward end of the tow bar carries the usual latching device for coupling to the towing vehicle.

The foregoing and other features of the invention will be better understood from the following detailed description and the accompanying drawing of which:

FIG. 1 is a side elevation view of a towing device according to this invention;

FIG. 2 is a view taken from line 2—2 of FIG. 1;

FIG. 3 is a view taken from line 3—3 of FIG. 1;

FIG. 4 illustrates the attachment of the towing device to a vehicle; and

FIG. 5 shows a detail taken at line 5—5 of FIG. 4.

The towing device shown in the drawing comprises a straight tow bar 10 having a tongue in the form of an angle member 11 fixed to the rear end of it and a locking attachment 12 fixed to the forward end for attachment to a towing vehicle. A horizontal cross-bar 13 is fastened to the top surface of the tow bar preferably by welding.

The opposite ends of the cross-bar have attached to them upstanding supports 14 and 14a which extend to an equal height above the cross-bar. Each of supports 14 and 14a has two holes 15 and 16 through it, located one above the other, through which respective pins 18 and 18a can be passed to pivot the supports to attachment plates 17 and 17a provided with corresponding holes through the lower part of their sides.

The attachment plates are adapted to be fastened to the front end of the vehicle as permanent parts thereof. The particular form and dimensions of the fastening plates will depend on the particular type of vehicle with which the towing device is to be used. The particular embodiment of the invention described herein below is adapted for use with Volkswagon models which have their engines at the rear and have a torsion bar assembly at the front end. It should be understood however that the invention can be used with other vehicles such as for example, Datsuns, Toyotas, Hondas and Pintos, which have their engines at the front end and a more standard front end assembly instead of the torsion bar assembly as used in the Volkswagons.

Each attachment plate 17 and 17a, configured to be fitted to Volkswagons, comprises two sides 19 and 20 joined at their rearward edges by a flat member 21 provided with a U-shaped slot 22 extending downward from the top and a hole 23 spaced at a distance below the lower end of the slot, the purpose of which is to attach to a structure 24, 24a which is a standard part of the Volkswagon vehicle. The structure 24, 24a comprises two head members spaced apart from each other as shown in FIG. 2. These head members are integral with or attached to the structural frame of the vehicle part of which, represented in phantom by the numeral 45, acts as a floor plate of the vehicle. These head members contain a pair of spaced semi-cylindrical recesses 31 and 32 at their forward face. There is fitted in front of each head member a cap 25, 25a also provided with a pair of similar semi-cylindrical recesses 33 and 34 juxtaposed to respective recesses 31 and 32.

In the absence of an attachment according to the present invention the vehicle is built with the heads 24, 24a and caps 25, 25a held together, although not necessarily touching each other, by cap screws 35 and 36 passing through holes 27 and 28 spaced apart from each other and threaded into tapped holes 39 and 40 in respective members 24, 24a, . The curved recesses 31, 33 and 32, 34 are dimensioned to receive torsion bars 37 and 38, with which the vehicle comes equipped, thus holding or clamping in position the torsion bars which extend horizontally across the front end of the vehicle in a well-known manner. The torsion bars may have freedom of movement through their cylinders in the direction of their longitudinal axes.

To provide for the towing device according to the present invention, the lower cap screws 36 are temporarily removed and the respective attachment plates 17, 17a according to this invention are brought against the front surfaces of the respective caps 25, 25a so that the upper cap screws 35 are within the respective U-slots 22, 22a and the holes 23, 23a through plates 21, 21a align with respective hole 28 of the caps. The lower cap screws 36, 36a are then passed through the plates 21, 21a and into the tapped holes 38 as before, thereby securing the attachment plates 17, 17a to the vehicle so that it becomes a permanent part of the vehicle.

There is also attached to the frame 45 of the vehicle at its underside and at a central location behind the clamp assemblies 24 and 24a, a yoke or strap 46 which extends in a transverse direction partly across the vehicle. The two side portions 46a and 46b of the yoke are at the same elevation and the central portion 46c is depressed sufficiently to permit reception of the horizontal extension of tongue 11. The side portions 46a and 46b are fastened to the vehicle frame portion 45 by bolts 47 and 47a. The yoke 46, like the attachment plates 17 and 17a, become permanent attachments to the vehicle.

The coupling member 12 is of a conventional type having the usual cap 41 adapted to fit over a spherical ball member at the rear of the towing vehicle and a latch member 42 to secure the cap 41 over the ball to prevent disengagement while towing. Since this member 12 is a conventional device no further description of it is needed here.

To apply the tow bar to the towed vehicle, the tongue 11 is fitted between the yoke 46 and the vehicle frame as shown, and the upstanding members 14 and 14a of the tow bar assembly are then attached to the respective attachment plates 17 and 17a by the pins 18 and 18a and secured by the respective cotter pins. The particular one of holes 15 and 16 to which the bolts 18 and 18a will be passed will depend on the relative locations of torsion bars 37 and 38 on the vehicle, the heights of the torsion bars relative to the vehicle frame not being the same in all Volkswagon models. For relatively low torsion bars the lower holes 14 and 14a will be used, but for somewhat higher torsion bars the other holes 16 and 16a will be used.

Furthermore, since the spacing between the torsion bars is not the same in all vehicle models, the upper torsion bar will not always coincide with the same position at slots 22 and 22a. These differences in height of the upper torsion bar are taken care of by the fact that these slots straddle the upper bolts 35, 35a thereby taking the proper position through the slot which conforms with the position of the upper torsion bar.

When the tow bar is thus fitted to the vehicle, lifting up the front end of the tow bar, for example by a jack or by people, will raise the forward wheels of the vehicle as illustrated in FIG. 4, so that the coupling 41 may be attached to the towing vehicle. The towed vehicle will remain stable because of the two spaced rear wheels and also the fact that the tow bar 10 extends forward in the direction the towed vehicle is facing and is centrally located as shown in FIG. 2. Stability is enchanced by the fact that the torsion rod clamping members 24 and 24a are spaced considerably apart and equal distances from the longitudinal center line of the vehicle.

It will be recognized that modifications can be made without departing from the scope of the invention, such as for example changes of dimension or changes in the number of holes such as holes 15 and 16 of the upstanding members. It should also be understood that the invention is not limited to the particular embodiment illustrated and described, which is given by way of example rather than of limitation, but only in accordance with the scope of the appended claims.

Although the invention has been illustrated and described with particular reference to Volkswagon models of motor vehicles it will be understood that it is likewise applicable to other vehicle models including those having engines at the front and without front end torsion bar assemblies as in the Volkswagons, for example, Datsuns, Toyotas, Pintos and Hondas. In adapting the towing device to such other vehicles it will ordinarily be required merely to adapt the attachment plates such as plates 17 and 17a to fasten to the vehicle frame at the front end assembly of the particular vehicle. In other respects the attachment plates will be similar to plates 17 and 17a and will be provided at their lower ends with a hole or holes such as 15 and 16 to receive pivot pins 18 and 18a.

The towing devices according to this invention will probably be used primarily with light weight vehicles. They could be adapted for heavier vehicles by making the parts strong enough and using a sturdy enough vehicle for towing.

What is claimed is:

1. Towing means for towing a four-wheeled vehicle having two front wheels and two rear wheels which normally roll on a roadway and having a frame provided with a yoke attached in a central position to the underside of said frame, and having a front end torsion bar assembly, comprising: a pair of spaced attaching plates fastened to the front end torsion bar assembly at positions on opposite sides of the central line of the vehicle, a tow bar, a cross bar attached to, and extending transverse, of and to both sides of, the tow bar at a position intermediate the ends of the tow bar, a pair of upstanding supports attached to said cross bar at respective locations on opposite sides of the tow bar, and means for pivoting each support to a respective one of the attaching plates, the rear end of the tow bar having a tongue member for engagement with said yoke and the forward end of the tow bar having coupling means for attachment to a towing vehicle, whereby lifting said forward end for attachment to such towing vehicle lifts the two front wheels off the roadway so that said four-wheeled vehicle is towed with only its rear wheels on the roadway.

2. Towing means according to claim 1 in which both of the pair of upstanding supports are located equidistant from the tow bar.

3. Towing means according to claim 1 in which each attaching plate is pivoted to its respective support by means of a pivot pin passing through the attaching plate and through one of a plurality of holes through its support.

4. Towing means according to claim 3 in which the plurality of holes are located one above another.

5. A tow bar assembly adapted for towing a four-wheeled vehicle having a front torsion bar assembly comprising a plurality of torsion bars spaced one above another and a pair of clamp means holding the torsion bars in position and attached at spaced positions equidistant from the center line of the vehicle at the front end thereof and having an attaching plate means attached to each of said clamp means and having a yoke attached to the vehicle frame at a position rearward of the torsion bar assembly and centrally located at the vehicle: said tow bar assembly comprising a bar having a tongue at the rear end adapted to engage said yoke and having a cross-bar at a position forward of the tongue and a pair of upstanding members attached to the cross-bar at positions equidistant from the tow bar and conforming with the distance apart of said clamp means, said upstanding members each having a plurality of holes spaced one above another by which they are adapted to be pivoted to the attaching plate means at one or another of said holes.

* * * * *

PO-1050
(5/69)

UNITED STATES PATENT OFFICE
CERTIFICATE OF CORRECTION

Patent No. 3,831,980    Dated August 27, 1974

Inventor(s) AUGUST A. KNIFF

It is certified that error appears in the above-identified patent and that said Letters Patent are hereby corrected as shown below:

Col. 1, line 12    "two" should read --tow--

Col. 2, line 45    "24a,." should read --24a.--

Col. 4, line 24
Claim 1, line 10    "transverse,of" should read --transverse of,"

Signed and sealed this 26th day of November 1974.

(SEAL)
Attest:

McCOY M. GIBSON JR.
Attesting Officer

C. MARSHALL DANN
Commissioner of Patents